United States Patent [19]
Hood et al.

[11] Patent Number: 5,822,967
[45] Date of Patent: Oct. 20, 1998

[54] BALER WITH SWING ARM BALE WRAPPER

[75] Inventors: William A. Hood; Alfred L. Van Maaren, both of Pella; Ryan G. Walker, Centerville, all of Iowa

[73] Assignee: Vermeer Manufacturing Co., Pella, Iowa

[21] Appl. No.: 661,946

[22] Filed: Jun. 11, 1996

[51] Int. Cl.[6] ............................ A01D 91/00; B30B 9/00
[52] U.S. Cl. .................................. 56/341; 100/5; 100/88
[58] Field of Search ............................ 53/118, 389, 587; 56/341, 344; 100/5, 88, 89; 414/246, 781

[56] References Cited

U.S. PATENT DOCUMENTS

| | | |
|---|---|---|
| 3,894,484 | 7/1975 | Anstey et al. . |
| 3,913,473 | 10/1975 | Meiers . |
| 4,077,179 | 3/1978 | Lancaster et al. . |
| 4,144,696 | 3/1979 | Gustavsson . |
| 4,173,112 | 11/1979 | Meiners . |
| 4,216,690 | 8/1980 | Bullock . |
| 4,281,500 | 8/1981 | Mueller et al. . |
| 4,296,595 | 10/1981 | Meiners . |
| 4,343,132 | 8/1982 | Lawless, Jr. . |

(List continued on next page.)

FOREIGN PATENT DOCUMENTS

| | | |
|---|---|---|
| 0 229 736 | 7/1987 | European Pat. Off. . |
| 2911-441 | 9/1980 | Germany . |
| 3301-420-A | 7/1984 | Germany . |
| 3805224 A1 | 8/1989 | Germany . |
| 41 20 733 C2 | 1/1993 | Germany . |
| 2 056 401 | 3/1981 | United Kingdom . |
| 2 159 489 | 12/1985 | United Kingdom . |
| 2 220 090 | 7/1988 | United Kingdom . |
| WO 96/08957 | 3/1996 | WIPO . |

OTHER PUBLICATIONS

Sales brochure entitled "Auto Wrappa, Mobile Automatic Bale Wrapping". (no date).
Sales brochure entitled "Hayday Autowrap 1500s". (1993).
Sales brochure entitled "Kverneland Square Bale Wrapper, The Square Bale Wrapper with all round performance". (May/1995).
Sales brochure entitled "AG Wrap Bale Wrapper". (no date).

*Primary Examiner*—Michael J. Carone
*Assistant Examiner*—Robert Pezzuto
*Attorney, Agent, or Firm*—Merchant, Gould, Smith, Edell, Welter & Schmidt, P.A.

[57] ABSTRACT

An apparatus for forming and wrapping round bales includes a baler, arm structure, a cradle, and moving structure. The baler is for taking in a crop material, forming the crop material into a bale, and ejecting the bale. The arm structure is connected to the baler. The cradle is pivotably supported by the arm structure and is for holding the ejected bale. The cradle includes rotating structure for rotating the bale about a central axis of the bale. Moving structure is for providing relative movement between the baler and the cradle. Wrapping structure is supported by the baler and is adapted for holding wrapping material. The wrapping structure is movable around the bale and cooperates with the rotating structure to be capable of wrapping the bale with the wrapping material.

42 Claims, 10 Drawing Sheets

U.S. PATENT DOCUMENTS

| | | |
|---|---|---|
| 4,366,665 | 1/1983 | VanGinhoven et al. . |
| 4,387,548 | 6/1983 | Lancaster et al. . |
| 4,387,552 | 6/1983 | Lancaster et al. . |
| 4,407,113 | 10/1983 | Core . |
| 4,409,784 | 10/1983 | Van Ginhoven et al. . |
| 4,514,969 | 5/1985 | Moosbruker et al. . |
| 4,563,863 | 1/1986 | Humphrey . |
| 4,578,923 | 4/1986 | Petterson . |
| 4,590,737 | 5/1986 | Rosenthal et al. . |
| 4,599,844 | 7/1986 | Clostermeyer et al. . |
| 4,606,172 | 8/1986 | Miller . |
| 4,619,102 | 10/1986 | Geisinger . |
| 4,641,484 | 2/1987 | Popelka . |
| 4,662,151 | 5/1987 | Mathes et al. . |
| 4,676,046 | 6/1987 | Verhulst et al. . |
| 4,677,807 | 7/1987 | Verhulst et al. . |
| 4,685,270 | 8/1987 | Brambilla . |
| 4,712,686 | 12/1987 | Lancaster et al. . |
| 4,729,213 | 3/1988 | Rase . |
| 4,779,526 | 10/1988 | Frerich et al. ............................. 100/5 |
| 4,787,193 | 11/1988 | Verhulst et al. . |
| 4,813,348 | 3/1989 | Frerich et al. ............................. 100/5 |
| 4,815,266 | 3/1989 | Ratelaff et al. ........................... 56/341 |
| 4,815,369 | 3/1989 | Akins . |
| 4,821,486 | 4/1989 | Oiestad . |
| 4,827,699 | 5/1989 | Shauman . |
| 4,889,047 | 12/1989 | Andueser et al. ..................... 56/341 X |
| 4,890,443 | 1/1990 | Diehm . |
| 4,891,930 | 1/1990 | Schaefer . |
| 4,922,690 | 5/1990 | Gusewell et al. . |
| 4,926,617 | 5/1990 | Van Mill . |
| 4,941,311 | 7/1990 | Ardueser et al. . |
| 4,956,959 | 9/1990 | Rumph et al. . |
| 4,956,960 | 9/1990 | Anstey et al. . |
| 4,956,968 | 9/1990 | Underhill . |
| 4,969,315 | 11/1990 | Ardueser et al. . |
| 4,972,656 | 11/1990 | Haugstad . |
| 4,986,057 | 1/1991 | Gainforth . |
| 5,020,311 | 6/1991 | Matthies . |
| 5,026,238 | 6/1991 | Walt . |
| 5,036,642 | 8/1991 | Underhill . |
| 5,042,225 | 8/1991 | Drury et al. . |
| 5,048,271 | 9/1991 | Walton . |
| 5,079,898 | 1/1992 | Springs et al. . |
| 5,105,607 | 4/1992 | Gratton . |
| 5,109,652 | 5/1992 | Viand et al. . |
| 5,129,215 | 7/1992 | Gratton . |
| 5,152,123 | 10/1992 | Viaud et al. . |
| 5,159,876 | 11/1992 | Olin ....................................... 56/341 X |
| 5,181,368 | 1/1993 | Anstey et al. . |
| 5,189,866 | 3/1993 | Krutza . |
| 5,216,873 | 6/1993 | Ratzlaff et al. . |
| 5,224,323 | 7/1993 | Fykse . |
| 5,231,828 | 8/1993 | Swearingen et al. . |
| 5,247,775 | 9/1993 | Viaud . |
| 5,263,410 | 11/1993 | Olin . |
| 5,301,495 | 4/1994 | Van Zee . |
| 5,311,729 | 5/1994 | Viaud . |
| 5,319,899 | 6/1994 | Jennings et al. . |

BALER WITH SWING ARM BALE WRAPPER

FIELD OF THE INVENTION

The present invention relates to agricultural machinery. More particularly, the invention relates to a baler with a swing arm bale wrapper.

BACKGROUND OF THE INVENTION

There are two separate machines on the market for baling and then wrapping the bale. This makes the process, baling and wrapping, very labor intensive. One person must operate the baler, and one or more persons must operate the wrapper.

The prior art includes a variety of types of wrappers. One type requires a person to bring the bale to the machine and load it, a second person to do the wrapping operation, and a third person to operate the tractor to move the wrapper. Another type is a self-propelled, self-loading machine, but it still require one person to haul the bales to the machine and one person to operate the wrapper. This makes baling and wrapping a three person operation. There is yet a third wrapper in the prior art. It is a three point unit allowing one person to pick up and wrap the bale as it is being transported off the field, but this still requires 2 people and 2 tractors, for the baling and wrapping operations.

Silage bales should not be left unwrapped for more than 4 hours because the material may start to spoil. Thus, it is important to wrap the bale soon after baling.

Consequently, a need exists for an apparatus for making bales and wrapping them which overcomes the aforementioned shortcomings associated with existing systems and machines.

SUMMARY OF THE INVENTION

The present invention is directed to an apparatus that substantially overcomes one or more of the problems due to limitations and disadvantages of the prior art.

To achieve the advantages of the invention and in accordance with the purposes of the invention, as embodied and broadly described herein, the invention comprises an apparatus for forming and wrapping round bales including a baler, arm structure, a cradle, and moving structure. The baler is for taking in a crop material, forming the crop material into a bale, and ejecting the bale. The arm structure is connected to the baler. The cradle is supported by the arm structure and is for holding the ejected bale. The cradle includes rotating structure for rotating the bale about at least one axis of the bale. The moving structure is associated with the baler and is for providing relative movement between the baler and the cradle.

Wrapping structure is supported by the baler and is adapted for holding wrapping material. The wrapping structure is movable around the bale and cooperates with the rotating structure to be capable of wrapping the bale with the wrapping material.

The baler includes an axle. Moving structure for providing relative motion between the baler and the cradle includes, preferably, a pair of arms pivotably connected to the axle utilizing torsional cartridge springs, air springs, a hydraulic cylinder(s), or a track. Alternatively, the entire baler may be moved with respect to the cradle using a hydraulic cylinder.

Preferably, the baler is a variable chamber baler, and the rotating structure is a belt system driven by a motor.

A hydraulic cylinder may be provided which is operatively associated with the cradle for tilting the cradle and dumping the bale from the cradle after the bale has been wrapped.

Preferably, the wrapping structure includes an arm support pivotably connected to the baler, and a swing arm pivotably connected to the arm support for moving around the bale. A cut-start member may be attached to the arm structure or baler structure for cutting and holding the wrapping material.

The baler may include a belt system; and the wrapping structure preferably includes a belt system supporter pivotably attached to the baler for holding the belt system clear of the swing arm. Alternatively, the baler is cleared of the wrapping structure by raising the forward portion.

Preferably, a kicker is connected to the arm structure for advancing the bale from the baler to the cradle.

In another aspect, the invention comprises a method for harvesting including the steps of picking up a crop material; forming a bale from the crop material with a variable chamber baler having a belt system; moving the belt system; and wrapping the bale with a wrapping material.

Preferably, to allow the bale to be wrapped, the belt system supporter moves into the belt system, clearing a path for the wrapper. Alternatively, the belt system is moved by pivoting the baler's belt system.

The step of wrapping the bale may include rotating the bale about a central axis while moving an arm holding the wrapping material around the bale. The method may also include the step of dumping the bale to a ground surface after the wrapping step.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention. In the drawings:

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numbers will be used throughout the drawings to refer to the same or like parts.

In accordance with the invention, the invention comprises an apparatus for forming and wrapping round bales. The apparatus results in a single machine which both makes the bale and wraps it, without any required intervention by another machine or person. A sole operator can easily perform both functions of making the bale and wrapping it. The wrapping function is performed immediately after the bale has been made. Therefore, there is no chance for spoilage of the silage due to delay between baling and wrapping.

As embodied herein, an apparatus for forming and wrapping round bales is shown in the FIGS. generally at 10. Apparatus 10 picks up crop material, such as silage, forms it into a cylindrical bale 36, and then wraps the bale with a wrapping material such as plastic wrap or foil. Apparatus 10 is one unitary machine. Bale 36 never touches the ground between the time when it is formed into a bale and when it is wrapped with the wrapping material. Apparatus 10 is usually pulled by a tractor, or other machinery.

Figure 1:
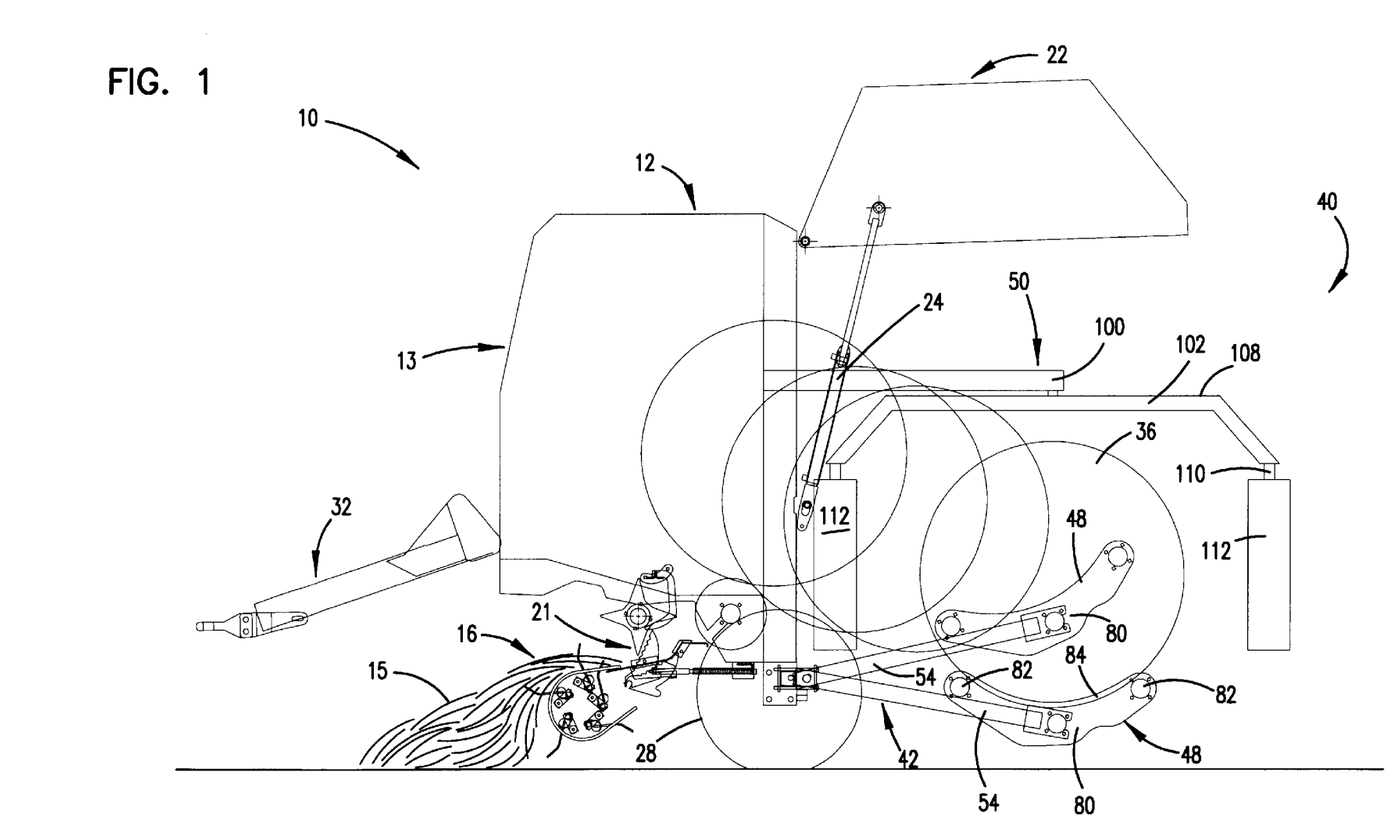
FIG. 1 is a front elevational view of a swing arm bale wrapper embodying the present invention.
Figure 8A:
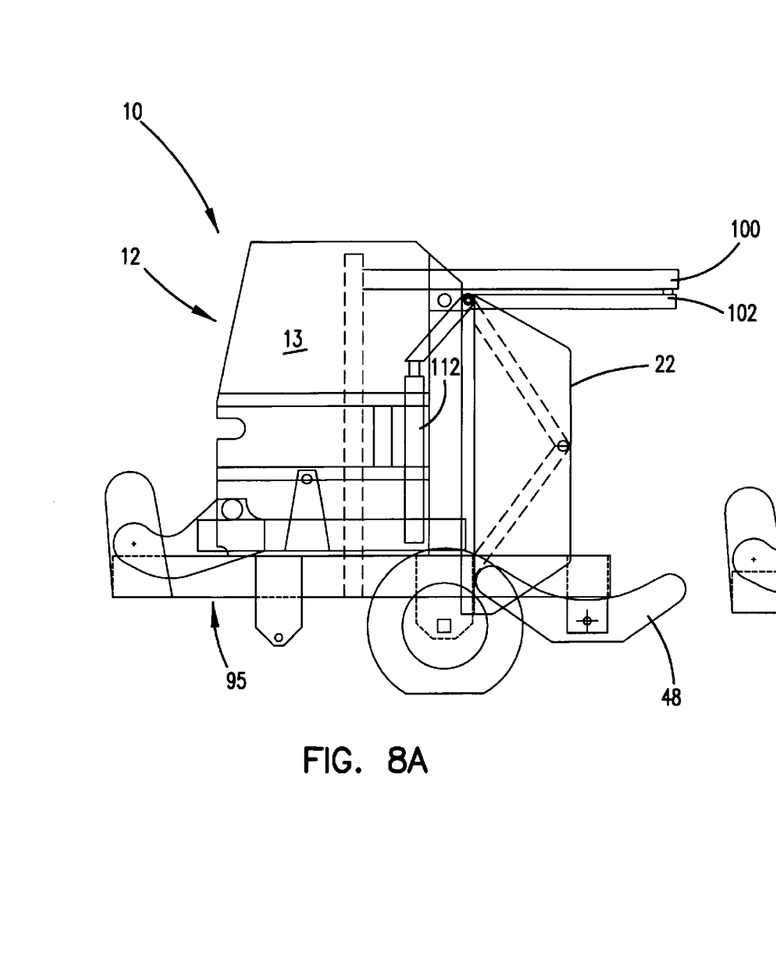
FIGS. 8A–8D are front elevational views of another embodiment of a baler having a swing arm wrapper, embodying the present invention.

The apparatus comprises a baler for taking in a crop material, forming the crop material into a bale and ejecting the bale from the baling chamber. As embodied herein, one part of apparatus 10 includes baler 12. Baler 12 is preferably a variable chamber baler, but may be a fixed chamber baler as well. One typical variable chamber baler is described in U.S. Pat. No. 3,722,197 issued to Gary J. Vermeer. Baler 12 includes a front portion 13 with an interior chamber 14 for forming the bale, and a tailgate 22. Tailgate 22 is movable between an open position as shown in FIG. 1 and a closed position as shown in FIG. 8A by way of a pair of hydraulic cylinder 24 connected to baler housing 13 and tailgate 22. Tailgate 22 functions to keep the bale inside of interior chamber 14 while it is being formed.

Baler 12 includes a crop pick up 16 at a lower portion below interior chamber 14. As baler 12 is moved across a field, pick up 16 moves across the field close to the ground and rotates to pick up and scoop crop material 15 from the ground and into interior chamber 14. Baler 12 may also include a chopper 21 for chopping crop material 15 after it has been picked up, but before it enters interior baling chamber 14. A hitch 32 is provided for attaching to a tractor or other machinery to pull baler 12 across a field.

Baler 12 includes an axle 26 which connects to front portion 13. At each end of axle 26 is a tire 28, 30. Axle 26 and tires 28, 30 are located generally central between baler 12 and the wrapper structure. This location of the axle and tires with respect to the baler and wrapping structure allows the overall apparatus to be more compact and allows for a safer machine by having a more even distribution of weight.

Figure 4:
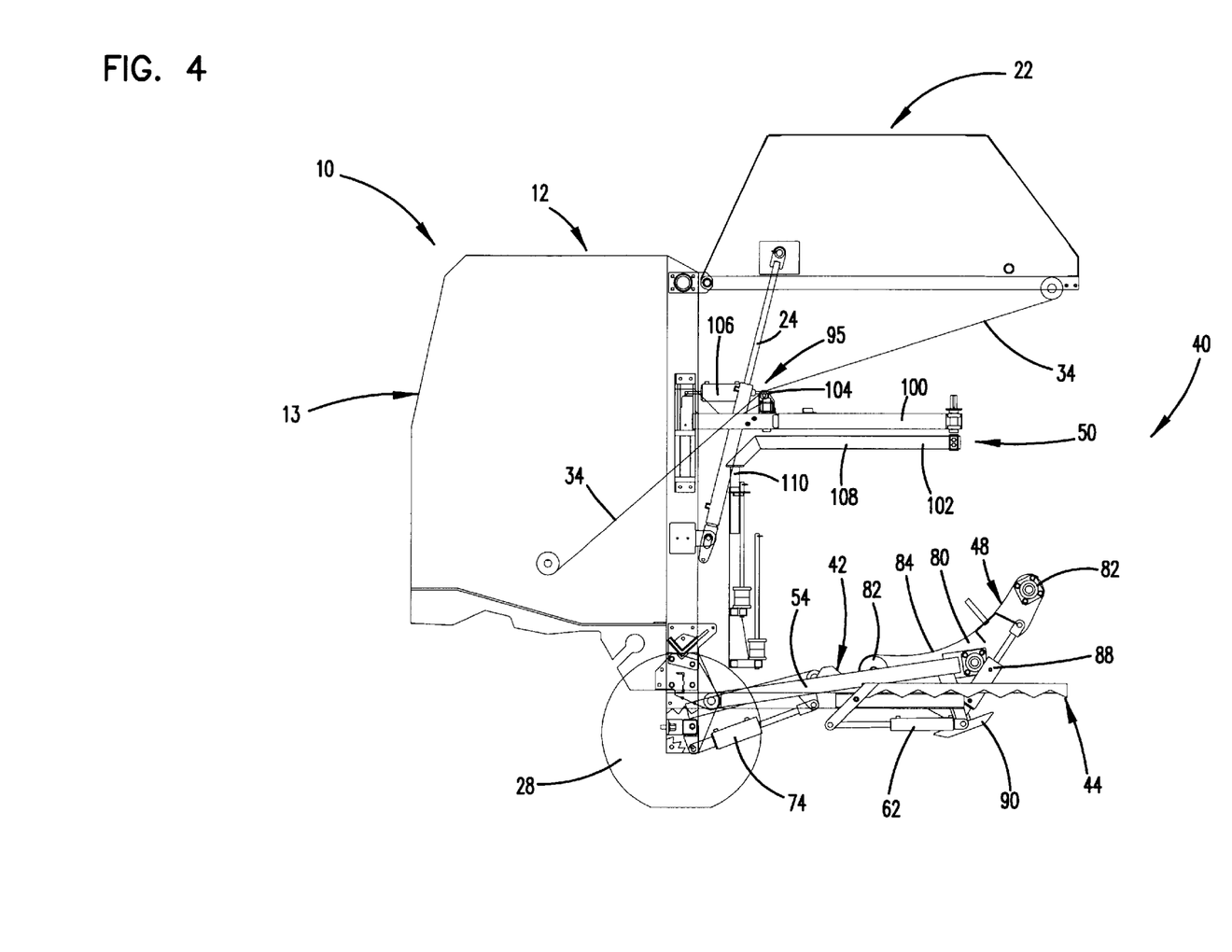
FIG. 4 is a front elevational view of another embodiment of a swing arm bale wrapper, embodying the present invention.
Figure 5:
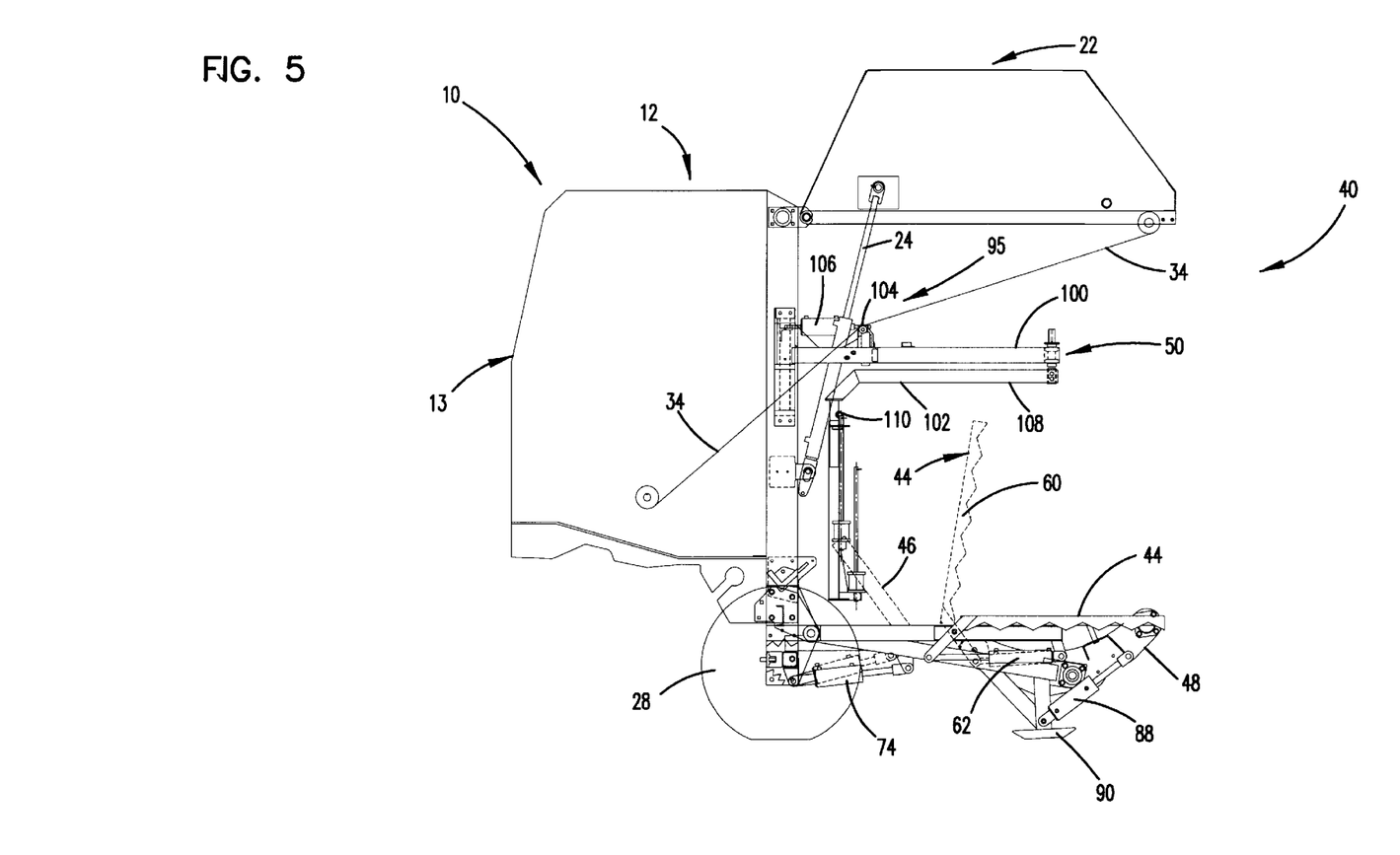
FIG. 5 is the view of FIG. 4 showing a cut-start mechanism in a raised position.

Baler 12 includes a belt system 34 which is used in conjunction with a roller system for forming a bale in a variable chamber baler. Belt system 34 extends between a roller of housing 13 in interior chamber 14 to an interior roller in tailgate 22 (FIGS. 4 and 5). As used herein, the term "belt system" may include a single belt, multiple belts, chains, or any other power transmission device.

In accordance with the invention, an apparatus for forming and wrapping round bales comprises a wrapper assembly. As embodied herein, one wrapper assembly is shown generally at 40. Wrapper assembly 40 includes structure which cooperates in combination to wrap a cylindrical bale after it has been formed in baler 12. Specifically, wrapper assembly 40 includes arm structure 42, a cut/start member 44, a kicker 46, a cradle 48, wrapping structure 50, and means for moving the belt system clear of the wrapping structure. Each of the elements of wrapper assembly 40 are discussed in detail below.

Arm structure 42 includes first and second arms 52, 54. First and second arms 52, 54 are rigid members or bars which extend from baler 12 to cradle 48. First and second arms 52, 54 are on opposite sides of apparatus 10 and are connected to the axle 26. At the opposite end of first and second arms 52, 54, cradle 48 is attached.

In accordance with the invention, the apparatus includes moving structure associated with the baler for providing relative movement between the baler and the cradle. Either the cradle moves with respect to the baler, or the baler moves with respect to the cradle. As herein embodied, the moving structure may include either cartridge springs, an air spring, a hydraulic cylinder, a track, or raising structure for raising the forward portion of the baler. Each of these is discussed below.

Figure 2:
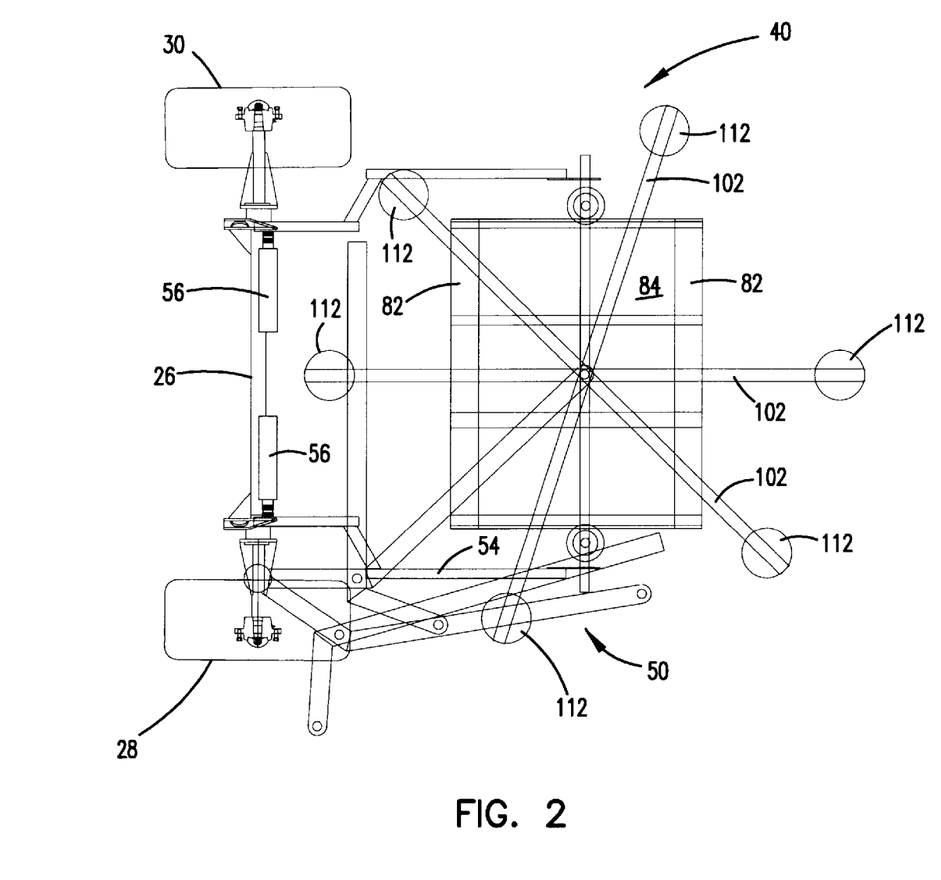
FIG. 2 is a partial top plan view of FIG. 1, embodying the present invention.

As illustrated in FIG. 2, cartridge springs 56 connect first and second arms 52, 54 to axle 26. Cartridge springs 56 and first and second arms 52, 54 function to hold cradle 48 in a position up and away from the ground surface. This is useful for when baler 12 is moving across a field and a bale is being formed. Arm structure 42 functions to support bale 36 after it is formed while it is rolling from baler 12 into cradle 48. The weight of bale 36 causes torque on first and second arms 52, 54. The torque acts on cartridge springs 56 and allows first and second arms 52, 54 and cradle 48 to pivot to the ground. This is shown in FIG. 1.

Figure 3:
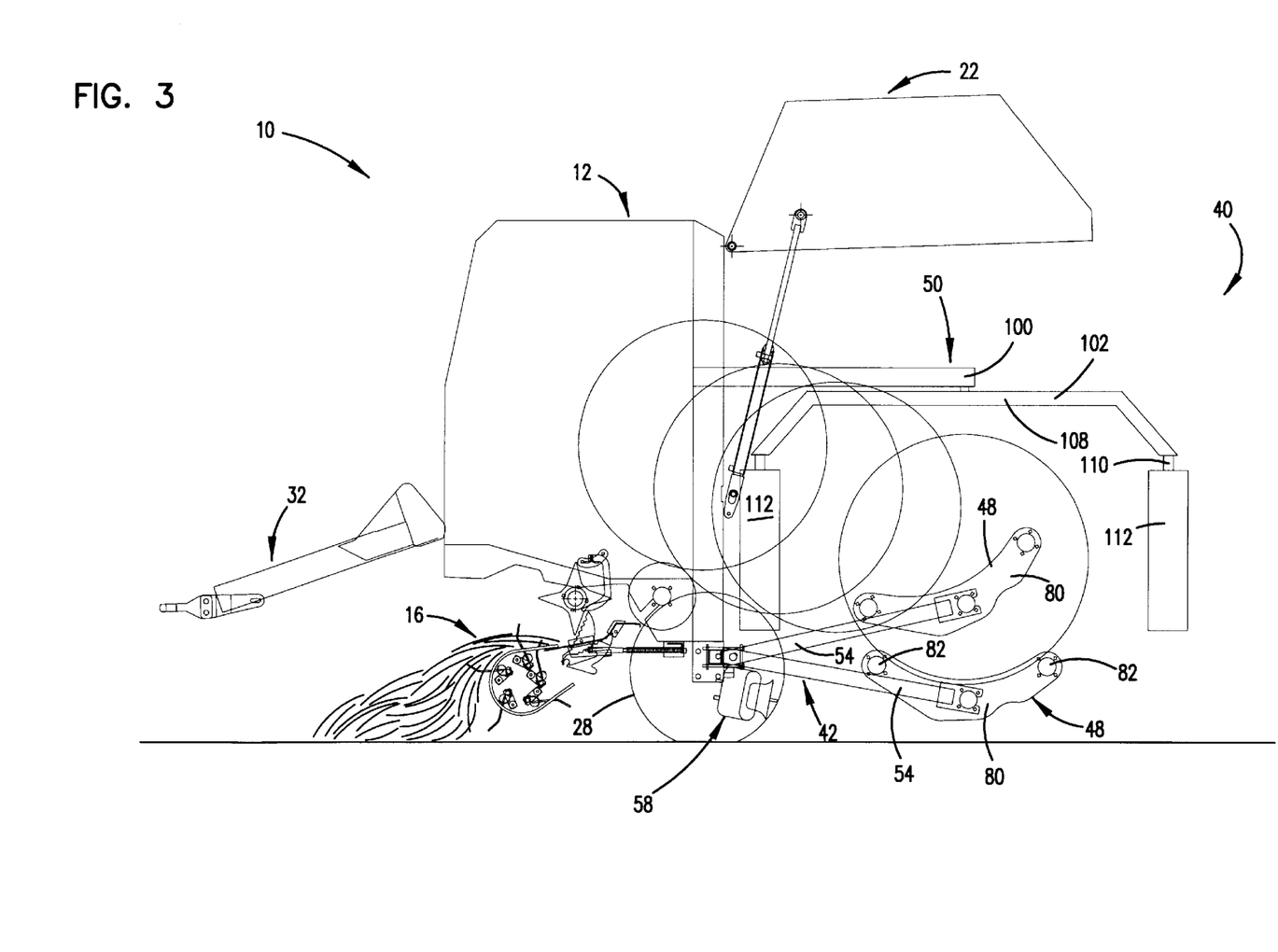
FIG. 3 is a front elevational view of another embodiment of a swing arm bale wrapper, embodying the present invention.

An alternative to using cartridge springs 56 to connected first and second arms 52, 54 to axle 26 is illustrated in FIG. 3. In FIG. 3, first and second arms 52, 54 are connected to axle 26 with simple pivot joints. An air spring 58 is positioned in such a manner to hold cradle 48 in a position up and away from the ground surface while baling. As bale 36 leaves the baling chambers, the weight of bale 36 causes air spring 58 to be compressed and cradle 48 to pivot to the ground.

Yet another alternative to using either cartridge springs or air spring(s) is illustrated FIGS. 4 and 5. A hydraulic cylinder(s) 74 pivots first and second arms 52, 54 about a pivot point on axle 26. This functions to move cradle 48 between a first position away from the ground and a second position supported by the ground. As will be described below, cylinder 74 also functions to energize kicker 46.

Figure 9:
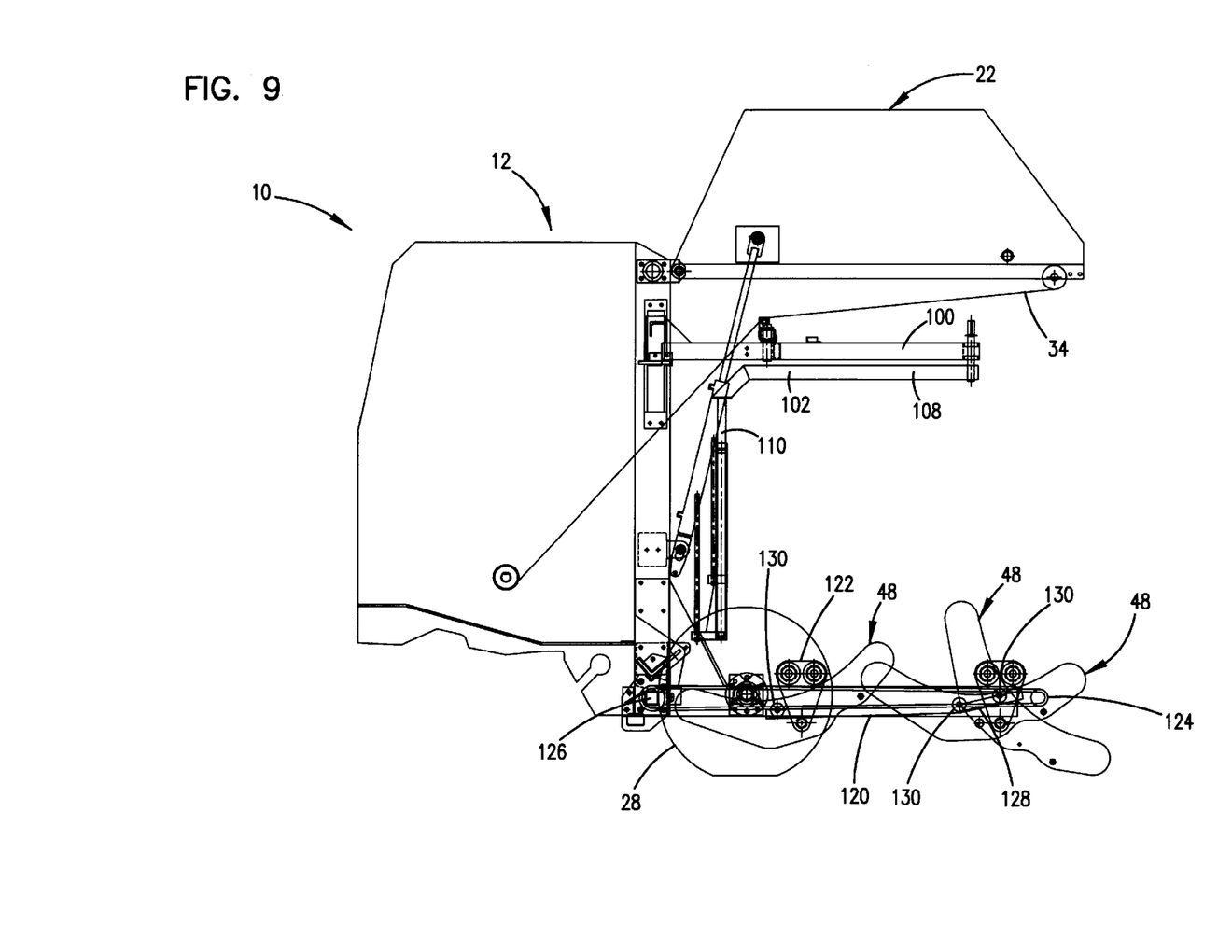
FIG. 9 is a front elevational view of another embodiment of a baler having a swing arm wrapper, embodying the present invention.

Another alternate embodiment is illustrated in FIG. 9. In this particular embodiment, cradle 48 is movable with respect to baler 12 through the use of a track. A track 120 is rigidly attached to baler 12 and functions as a guiding support to allow cradle 48 to move relative to the baler. A pair of rolling cradle supports 122 carry cradle 48 away from baler 12 to a position distal from baler 12. Cradle 48 is driven down track 120 by a chain 124 that is connected to rolling cradle support 122 and driven by a hydraulic motor 126. The cradle 48 is pivotably connected to the rolling cradle support 122. The rotational position of the cradle is controlled by a cam following roller 130 attached to the cradle and cam track 128 connected to track 120. Sloped portion of cam track 128 allows cradle 48 to dump a wrapped bale onto the ground without the aid of any extra hydraulics. After a bale is made in baler 12, tailgate 22 is raised, and a bale drops by gravity into cradle 48. Rolling cradle supports 122 carries cradle 48 away from baler 12 to be positioned distal from baler 12. This puts the bale in a position to be wrapped. After the bale is wrapped, cradle 48 is advanced, and cradle 48 dumps the bale. Cradle 48 then returns to its original position proximate to baler 12. Tailgate 22 is closed, and baler 12 is ready to make another bale.

Figure 8B:
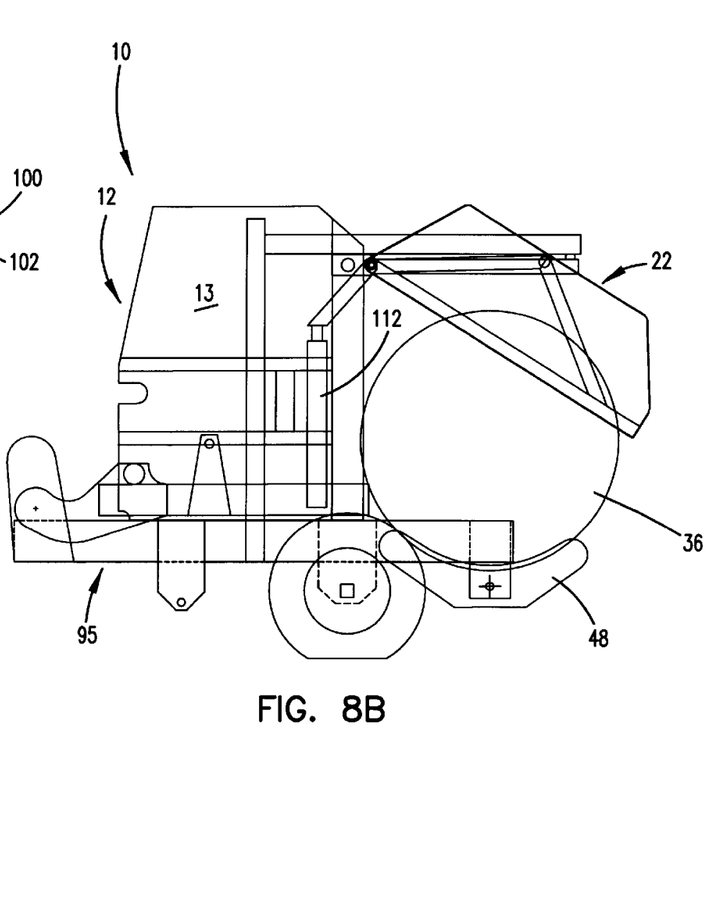
Figure 8C:
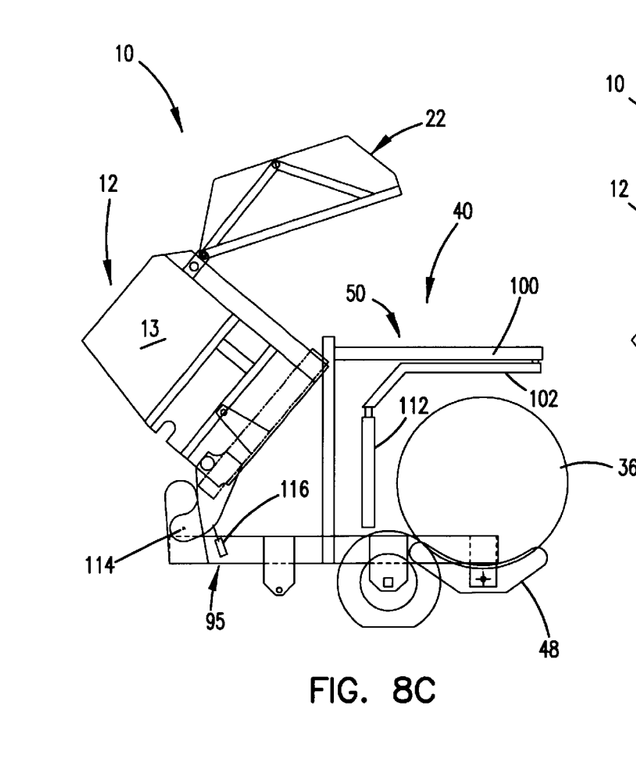

FIG. 8C illustrates another embodiment of moving structure for providing relative movement between the baler and the cradle. In this particular embodiment, the moving structure includes raising structure which functions to move the baler with respect to the cradle. Specifically, front portion 13 of baler 12 is raised upwardly about pivot point 114 by hydraulic cylinder 116. The advantages of this embodiment are explained below in conjunction with the means for moving the belt system clear of the wrapping structure.

Connected to baler 12 with a rigid member 66 is a cut/start member 44. Cut/start member 44 includes a knife 60 driven between a position adjacent to cradle 48 and a vertical position angled away from cradle 48. Vertical position of knife 60 is shown in phantom in FIG. 5. Knife 60 is driven between these two positions by a hydraulic cylinder 62 connected to rigid member 66. When cylinder 62 is in its fully extended position (FIG. 4), knife 60 is in its position adjacent to cradle 46. When cylinder 62 is retracted, knife 60 moves to its vertical position shown in phantom in FIG. 5. Cut/start member 44 functions to hold the plastic wrap initially to begin the wrapping process. As one of the final steps of the wrapping process, cylinder 62 is retracted. This raises knife 60, and when the stretched plastic is in the path of cut start member 44, knife 60 is lowered in order to cut it and hold the end. Cut start member 44 is conventional and known in the art. One typical cut start member is described in U.S. Pat. No. 4,972,656 to Haugstad.

Figure 6:
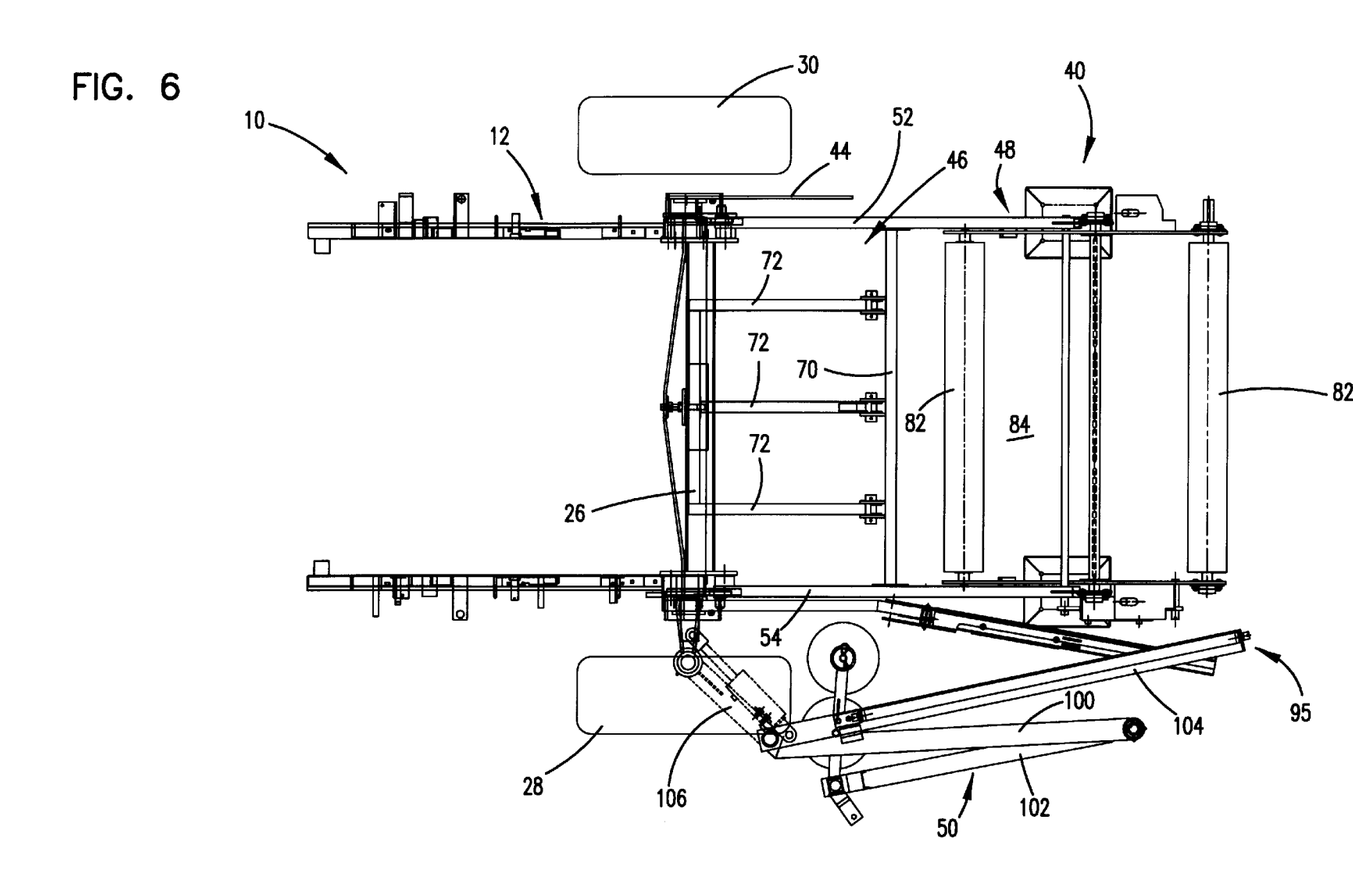
FIG. 6 is a partial top plan view of FIG. 4, embodying the present invention.

Kicker 46 is connected to arm structure 42 in order to advance bale 36 from baler 12 to cradle 48. Kicker 46 includes a transverse rigid member 70 connecting first and second arms 52, 54, and a plurality of kick bars 72 pivotably attached to transverse member 70 (FIG. 6). Hydraulic cylinder 74 which functions to move the cradle between a first position away from the ground and a second position supported by the ground also functions to pivot kick bars 72 about transverse member 70. When cylinder 74 is fully retracted, as seen in FIG. 5, kick bars 72 are pivoted into a position angled away from arm structure 42. This forces bale 36 into cradle 48. Cylinder 74 is then extended to lower kick bars 72 out of the way of wrapping structure 50.

In accordance with the invention, the apparatus includes a cradle supported by the arm structure for holding the ejected bale and including rotating structure for rotating the bale about a central axis of the bale. As embodied herein, cradle 48 includes a rigid U-shaped member 80 which has a curved shape in order to better accommodate the rounded outer surface of a cylindrical bale. Cradle 48 includes a pair of rollers 82 for driving a belt system 84. A motor 86 turns one or both rollers 82 which in turn drive belt system 84. Rollers 82 and belt system 84 rotate bale 36 about its central cylindrical axis. As will be described below, the turning of bale 36 about its cylindrical axis in combination with wrapping structure 50 completely wraps bale 36.

Figure 8D:
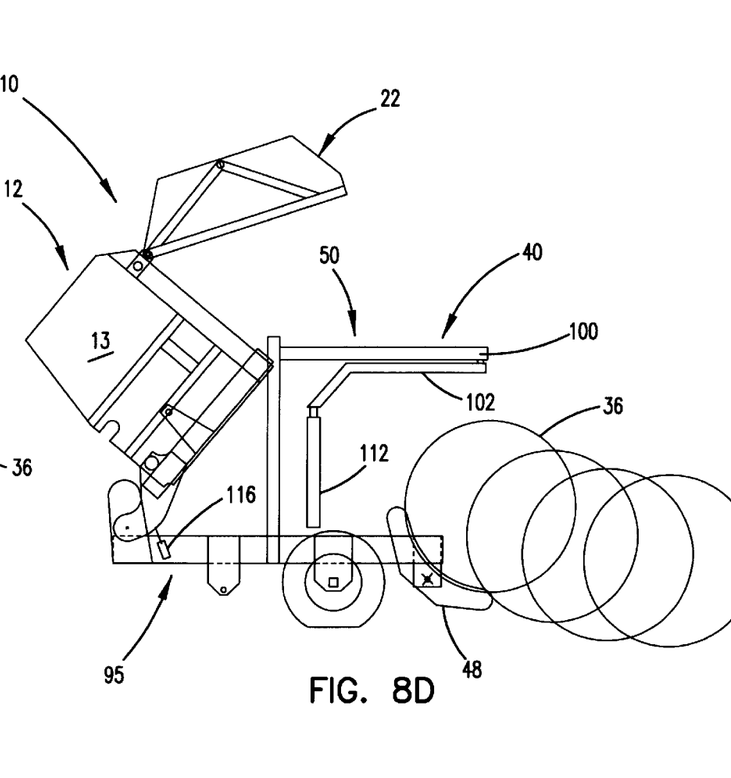

A hydraulic cylinder 88 is operatively associated with cradle 48 for tilting cradle 48 away from wrapper assembly 40 and toward the ground surface in order to dump a completely wrapped bale onto the ground. As illustrated in FIGS. 4 and 5, hydraulic cylinder 88 is pivotably connected to cradle 48 at one end. At an opposite end, cylinder 88 is pivotably connected to a leg 90. Leg 90 functions to support the weight of bale 36 when the bale is resting in the cradle and being wrapped by wrapping structure 50. In FIG. 4, it is illustrated that when cradle 48 is in its up position, leg 90 is up and away from the ground. This allows apparatus 10 to freely move across the ground, such as when it is picking up the crop material. In FIG. 5, it is illustrated that when cradle 48 is in its second or down position, i.e., when it is supporting a bale 36, leg 90 is resting on the ground surface. FIG. 8D shows cradle 48 when it is in its dumping position. In this position, hydraulic cylinder 88 is retracted and tilts cradle away from wrapper assembly 40 and toward the ground in order to cause bale 36 to roll out of cradle 48 and onto the ground. Leg 90 could also be attached to either of arms 52 or 54.

In accordance with the invention, the apparatus includes wrapping structure supported by the baler and adapted for holding wrapping material. The wrapping structure is movable around the bale and cooperates with the rotating structure to be capable of wrapping the bale with the wrapping material. As embodied herein, wrapping structure 50 includes an arm support 100 pivotably connected to baler 12 and a swing arm 102 pivotably connected to arm support 100.

Arm support 100 is a straight rigid member pivotably connected to baler 12, and movable with a hydraulic cylinder 106. Arm support 100 could be attached to the cradle instead of the baler. If attached to the cradle, arm support 100 is still supported by the baler because the cradle is attached to the baler. Thus, as used herein, the language "wrapping structure supported by the baler" includes both a direct connection of the wrapping structure to the baler, and an indirect connection to the baler (i.e., through the cradle to the baler).

Figure 7:
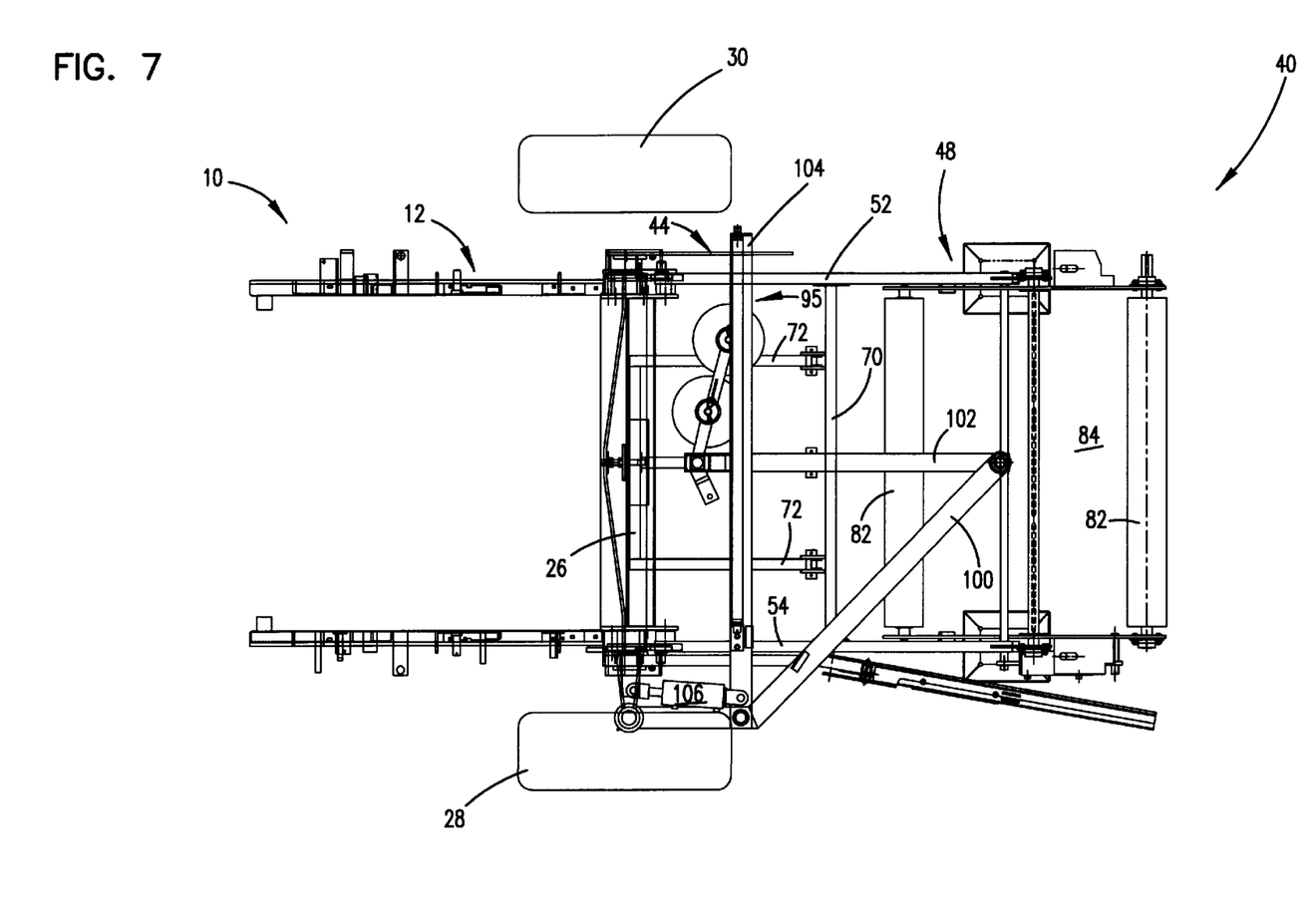
FIG. 7 is the view of FIG. 6, with the wrapping structure in a wrapping position, embodying the present invention.

Cylinder 106 functions to move wrapping structure 50 between a wrapping position, illustrated in FIG. 7, and a load/unload position illustrated in FIG. 6. Swing arm 102 is pivotably connected to arm support 100. Swing arm 102 is L-shaped including a first portion 108 which is usually over the top of bale 36 when it is being wrapped, and second portion 110 which usually travels around the cylindrical side of bale 36 when it is being wrapped. Second portion 110 is adapted for holding wrapping material 112. Wrapping material 112 may include a roll of stretchable plastic wrap, such as SUN FILM™, a plastic wrap available from AEP Industries, Matthew, N.C. Swing arm 102 is driven around bale 36 in order to move wrapping material 112 around the bale and completely wrap it. FIG. 1 illustrates 2 positions of wrapping material 112 as it is being driven around bale 36. FIG. 2 illustrates arm 102 and wrapping material 112 at a series of positions all around bale 36.

In accordance with the invention, the wrapping structure includes means for moving the belt system clear of the wrapping structure. As embodied herein, a means for moving is shown in the drawings at 95. One function of the means for moving is to allow enough clearance between the baler and the wrapping structure to allow the wrapping structure to wrap the bale. One particular means for moving 95 is illustrated in FIGS. 6 and 7 as a belt system supporter 104.

Belt system supporter 104 is pivotably connected to baler 12 and arm support 100 and moves along with arm support 100. Belt system supporter functions to hold belt systems 34 in a position up and away from wrapping structure 50, in order to clear belt systems 34 from the motions of wrapping structure 50 (FIGS. 4 and 5). Belt system supporter 104 includes a roller 68 shown in FIG. 7, which allows belts to continue to move during the wrapping process.

Another example of a means for moving is illustrated in FIGS. 8A–8D. In the embodiment illustrated in FIGS. 8A–8D, baler housing 12 is tiltable by hydraulic cylinder 116 in order to clear it of wrapping structure 50. In other words, instead of having belt system supporter 104 to hold belt systems 34 clear of wrapping structure 50, in this case the entire baler 12 is moved clear of wrapping structure 50. Further, this design allows the overall length of apparatus 10 to be shorter, as there is no need for any substantial distance between the end of the baler and the cradle. There is no need for a kicker to advance the bale from the baler to the cradle. This is explained below.

FIG. 8A illustrates baler 12 and wrapper assembly 40 in its initial position while a bale is being made in baler 12. FIG. 8B illustrates tailgate 22 in an open position which has allowed bale 36 to move by gravity into cradle 48. Because cradle 48 is located immediately adjacent to baler 12, bale 36 drops directly into it as tailgate 22 is opened.

FIG. 8C illustrates front portion 13 of baler 12 being raised upwardly about pivot point 114 by hydraulic cylinder 116. This clears baler 12 and belt system 34 out of the way of wrapping structure 50 to allow wrapping structure to freely move around and about bale 36. Belt system 84 on cradle 48 moves bale 36 about its central axis, while swing arm 102 moves wrapping material 112 about bale 36. After bale 36 is completely wrapped, cut/start mechanism 44 cuts and holds the wrapping material. Arm support 100 is swung to the side, and cradle 48 is tilted as illustrated in FIG. 8D to dump wrapped bale 36 onto the ground. Cradle 48 tilts back to its original position, and tailgate 22 is returned to its closed position. Front portion 13 of baler 12 is also returned to its operating position, illustrated in FIG. 8A.

In operation, to use apparatus 10 and its embodiment shown in FIGS. 1 and 2, a user would execute the following steps: Baler 12 is moved along the ground while pick up 16 picks up crop material 15 and moves it to interior chamber 14. Baler 12 then makes bale 36, in a way that is known in the art. First and second arms 52, 54 connected to cartridge springs 56 hold cradle 48 in an upright position above the ground as bale 36 is formed in baler 12. After bale 36 is formed, tailgate 22 is raised and allows bale 36 to roll onto first and second arms 52, 54. This causes torque on cartridge springs 56, which causes first and second arms 52, 54 and cradle 48 to rotate to the ground, putting bale 36 in a position to be wrapped by swing arm 102. Belt system 84 on cradle 48 turn concurrently with swing arm 102 and wrap bale 36. After bale 36 is wrapped, hydraulic cylinder 88 retracts and moves cradle 48 into a dumping position to dump the wrapped bale from cradle 48 to the ground. Cradle 48 is then moved back to its original position.

To use the embodiment shown in FIG. 3, the steps are similar to those described with respect to FIGS. 1 and 2, except instead of cartridge springs 56, air springs 58 are used to control pivoting motion of cradle 48.

To use the embodiment illustrated in FIGS. 4–7, the following steps are executed: First, crop material is picked up by pick up 16 (which is not shown in FIGS. 4–7 but which is similar to that illustrated in FIGS. 1 and 3), and is routed to interior chamber 14 where bale 36 is formed. Tailgate 22 is raised, and bale 36 rolls onto kicker arms 72 by gravity. Hydraulic cylinder 74 is then fully retracted, as shown in FIG. 5, and kick bar 72 is raised to a vertical position to force bale 36 into cradle 48. Cylinder 88 is then extended to lower kick bar 72 out of the way of swing arm 102. Next, swing arm support cylinder 106 swings belt system supporter 104 into belt system 34 to hold belt system 34 out of the way for the wrapping process. Next, a motor drive belt system 84 on cradle 48 to rotate bale 36 about a central cylindrical axis, and swing arm 102 is activated to wrap bale 36. Swing arm 102 is rotated about the periphery of bale 36. When swing arm 102 is on its final pass, cut/start cylinder 62 is retracted bringing knife 60 to a vertical position. Swing arm 102 is then stopped in an appropriate position so that knife 60 is poised ready to cut the wrapping material and hold the wrapping material for the next bale. Swing arm support cylinder 106 is then extended, moving swing arm support 100, swing arm 102, and belt system supporter 104 to the side, as shown in FIG. 6, and out of the way. At this time, cut/start cylinder 62 is activated to cut the wrapping material and hold it for the next bale. Cradle dump cylinder 88 is then retracted, dumping the bale to the ground. After this, cradle 48 is returned to its original horizontal position by extending cylinder 88. Hydraulic cylinder 74 for kick bars 72 is fully extended, lifting cradle 48 to an upward position to allow it to travel over the field. Tailgate 22 is then closed, and apparatus 10 is ready to make another bale.

To use the embodiment illustrated in FIG. 8, one would execute the following steps. First, a bale is formed in baler 12 as described above. When bale 36 is completed, tailgate 22 is moved to its open position, and bale 36 rolls into cradle 48. Front portion 13 of baler 12 is then tilted up by hydraulic cylinder 116. This moves belt system 34 out of the way of the wrapping structure. Swing arm support 100 is swung into position over the center of bale 36. Bale 36 is then wrapped by swing arm 102 going around bale 36, while bale 36 is spun about its central axis by belt system 84 on cradle 48. After bale 36 is completely wrapped, cut/start member 44 cuts the wrapping material and holds it for the next bale. Swing arm support 100 is swung to the side of apparatus 10, and cradle 48 is tilted to dump bale 36 onto the ground. Cradle 48 is then tilted back to its original position, and tailgate 22 is moved to its closed position, front portion 13 of baler is returned back to its original down position. Baler 12 is then ready to make another bale.

To use the embodiment shown in FIG. 9, all processes are the same as described for FIGS. 4–7 with the exception of movement of the cradle 48 and bale 36. The cradle 48 starts adjacent to the baler 10 in a bale receiving tilted position. The cradle 48 is then moved along a track leveling the bale and putting it in a position to be wrapped. After the bale is wrapped the cradle 48 is moved further from the baler forcing the cradle to tilt and dump the bale. Then the cradle is returned to its original position.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. An apparatus comprising:

a baler for taking in a crop material, forming the crop material into a bale, and ejecting the bale;

arm structure connected to the baler;

a cradle supported by the arm structure for holding the ejected bale and including rotating structure for rotating the bale about at least one axis of the bale;

moving structure associated with the baler for providing relative movement between the baler and the cradle;

wrapping structure supported by the baler; and a hydraulic cylinder operatively associated with the cradle for tilting the cradle and dumping the bale from the cradle.

2. The apparatus of claim 1, wherein the wrapping structure is movable around the bale.

3. The apparatus of claim 1, wherein:

the baler includes an axle;

the arm structure includes a pair of arms; and the moving structure includes torsional cartridge springs connecting the axle to the pair of arms.

4. The apparatus of claim 1, wherein:

the baler includes an axle;

the arm structure includes a pair of arms pivotably connected to the axle; and the moving structure includes an air spring supporting the pair of arms.

5. The apparatus of claim 1, wherein:

the baler includes an axle;

the arm structure includes a pair of arms pivotably connected to the axle; and the moving structure includes a hydraulic cylinder supporting the pair of arms.

6. The apparatus of claim 1, wherein:

the baler includes an axle;

the arm structure includes a track rigidly attached to the baler; and the moving structure includes a rolling cradle support pivotably connected to the cradle.

7. The apparatus of claim 1, wherein the baler is a variable chamber baler.

8. The apparatus of claim 1, wherein the rotating structure is a belt system driven by a motor.

9. The apparatus of claim 2, wherein the wrapping structure includes an arm support pivotably connected to the baler, and a swing arm pivotably connected to the arm support for moving around the bale.

10. The apparatus of claim 9, further including wrapping material supported by the swing arm.

11. The apparatus of claim 10, further including a cut-start member attached to the arm structure for cutting and holding the wrapping material.

12. The apparatus of claim 11, wherein the cut-start member is movable between a first position adjacent to the cradle and a second position angled away from the cradle.

13. The apparatus of claim 9, wherein:

the baler includes a belt system capable of turning within the baler; and a belt system supporter is pivotably attached to the baler for holding the belt system clear of the swing arm.

14. The apparatus of claim 13, wherein the belt system supporter includes a roller mounted to support the belt system and allow the belt system to continue to turn within the baler.

15. The apparatus of claim 1, further including a kicker supported by the baler for advancing the bale from the baler to the cradle.

16. The apparatus of claim 1, wherein:

the baler includes a forward portion, a rear portion with a tailgate movable between open and closed positions; and the moving structure includes raising structure for raising the forward portion, wherein the baler ejects the bale by moving the tailgate to the open position.

17. The apparatus of claim 16, wherein the baler is cleared of the wrapping structure by raising the forward portion.

18. An apparatus comprising:

a variable chamber baler including a baling chamber and a belt system turning within the baling chamber; the baler being adapted for receiving a crop material to form a cylindrical bale; and a wrapper assembly connected to the baler for wrapping the bale outside of the baling chamber with a wrapping material including:

arms pivotably attached to the baler;

a cradle connected to the arms for holding the bale outside of the baling chamber while the bale is being wrapped;

wrapping structure attached to the baler for moving around the bale and wrapping the bale outside of the baling chamber with the wrapping material; and means for moving the belt system clear of the wrapping structure.

19. The apparatus of claim 18, wherein the means for moving the belt system includes a belt system supporter pivotably attached to the baler for pushing the belt system clear from the wrapping structure.

20. The apparatus of claim 19, wherein the belt system supporter includes a roller mounted to support the belt system and allow the belt system to continue to turn within the baler.

21. The apparatus of claim 18, wherein the baler includes a forward portion and a rear portion, and wherein the means for moving the belt system includes a hydraulic cylinder attached to the baler for raising the forward portion to move the rear portion away from the wrapping structure.

22. The apparatus of claim 18, further including a kicking assembly operatively associated with the arms for advancing the bale from the arms to the cradle.

23. The apparatus of claim 22, wherein the kicking assembly includes a kicker connected to the arms and supported by the baler to allow the kicker to lift the cradle.

24. The apparatus of claim 18, wherein the wrapping structure includes an arm support pivotably attached to the baler, and a swing arm pivotably attached to the arm support and for holding the wrapping material.

25. A method for harvesting including the steps of:

picking up a crop material;

forming a bale from the crop material inside of a baling chamber of a variable chamber baler; the variable chamber baler having a belt system within the baling chamber;

ejecting the bale from the baling chamber;

after said step of ejecting, moving the belt system; and after said steps of ejecting and moving, wrapping the bale outside of the baling chamber with a wrapping material.

26. The method of claim 25, wherein the step of moving the belt system includes swinging a belt system supporter into the belt system to clear the belt system of wrapping structure and allow the bale to be wrapped.

27. The method of claim 26, wherein the step of moving the belt system includes supporting the belt system with a roller mounted on the belt system supporter to permit the belt system to turn within the baler.

28. The method of claim 25, wherein the step of moving the belt system includes pivoting the baler to clear the belt system of wrapping structure and allow the bale to be wrapped.

29. The method of claim 25, wherein the step of wrapping the bale includes rotating the bale about a central axis while moving an arm holding the wrapping material around the bale.

30. The method of claim 28, further including the step of dumping the bale to a ground surface after the wrapping step.

31. An apparatus comprising:
a baler for taking in a crop material, forming the crop material into a bale, and ejecting the bale;
arm structure connected to the baler;
a cradle supported by the arm structure for holding the ejected bale; the cradle including rotating structure for rotating the bale about at least one axis of the bale;
moving structure associated with the baler for providing relative movement between the baler and the cradle;
wrapping structure supported by the baler and being movable around the bale; the wrapping structure including an arm support pivotably connected to the baler, and a swing arm pivotably connected to the arm support for moving around the bale;
wrapping material supported by the swing arm; and
a cut-start member attached to the arm structure for cutting and holding the wrapping material; the cut-start member being movable between a first position adjacent to the cradle and a second position angled away from the cradle.

32. The apparatus of claim 31, further including a kicker supported by the baler for advancing the bale from the baler to the cradle.

33. The apparatus of claim 31, wherein:
the baler includes a forward portion, a rear portion with a tailgate movable between open and closed positions; and
the moving structure includes raising structure for raising the forward portion, wherein the baler ejects the bale by moving the tailgate to the open position.

34. The apparatus of claim 31, further including a hydraulic cylinder operatively associated with the cradle for tilting the cradle and dumping the bale from the cradle after the bale has been wrapped.

35. The apparatus of claim 31, wherein:
the baler includes an axle;
the arm structure includes a pair of arms; and
the moving structure includes torsional cartridge springs connecting the axle to the pair of arms.

36. The apparatus of claim 31, wherein:
the baler includes an axle;
the arm structure includes a pair of arms pivotably connected to the axle; and
the moving structure includes an air spring supporting the pair of arms.

37. The apparatus of claim 31, wherein:
the baler includes an axle;
the arm structure includes a pair of arms pivotably connected to the axle; and
the moving structure includes a hydraulic cylinder supporting the pair of arms.

38. The apparatus of claim 31, wherein:
the baler includes an axle;
the arm structure includes a track rigidly attached to the baler; and
the moving structure includes a rolling cradle support pivotably connected to the cradle.

39. An apparatus comprising:
(a) a baler for taking in a crop material, forming the crop material into a bale in a baling chamber, and ejecting the bale outside of the baling chamber;
(b) a cradle support member connected to the baler;
(c) a cradle outside of the baling chamber and supported by the cradle support member; the cradle for holding the ejected bale outside of the baling chamber; the cradle including rotating structure for rotating the bale about at least one axis of the bale;
(d) moving structure associated with the baler for providing relative movement between the baler and the cradle; and
(e) a swing arm supported by the baler and being movable around the ejected bale.

40. The apparatus of claim 39 further including wrapping material supported by the swing arm.

41. The apparatus of claim 40, further including a cut-start member movable between a first position adjacent to the cradle and a second position angled away from the cradle.

42. The apparatus of claim 39, further including a kick member supported by the baler for advancing the bale from the baler to the cradle.

* * * * *